United States Patent [19]

Wang et al.

[11] Patent Number: 4,638,118
[45] Date of Patent: Jan. 20, 1987

[54] WRITING PAD

[75] Inventors: An Wang, Lincoln; Shu-Kuang Ho, Carlisle, both of Mass.; Carlos I. Mainemer, Nashua, N.H.

[73] Assignee: Wang Laboratories, Inc., Lowell, Mass.

[21] Appl. No.: 710,198

[22] Filed: Mar. 11, 1985

[51] Int. Cl.$^4$ .............................................. G08C 21/00
[52] U.S. Cl. ........................................ 178/18; 178/20
[58] Field of Search .............................. 178/18, 19, 20

[56] References Cited

U.S. PATENT DOCUMENTS 3,832,693  8/1974  Ishizaki et al. ................... 178/19 X
4,079,194  3/1978  Kley ...................................... 178/18

Primary Examiner—Stafford D. Schreyer
Attorney, Agent, or Firm—Michael H. Shanahan

[57] ABSTRACT

A writing pad in which a grid of electrical elements defines an array of discrete locations on the writing surface with a density of at least $100 \times 50 = 5000$ locations per square inch, and digital circuitry is connected to the grid to determine the locations at which writing stimuli are being received. In other aspects, circuitry is used to identify the upper and lower boundaries along one dimension of the writing surface, of a local region at which writing stimuli are being received; the writing surface is scanned to identify the coordinate value along one dimension of a point at which writing stimuli are being received, by scanning respectively different predetermined portions of the writing surface along that one dimension, all of the portions being scanned simultaneously; a local zone is defined in the vicinity of an identified point of touching, and limits the scanning to that local zone; and a portion of the writing surface includes key zones and a particular digital symbol is generated in response to writing stimuli being received at any of the locations corresponding to one of the key zones.

24 Claims, 10 Drawing Figures

WRITING PAD

BACKGROUND OF THE INVENTION

This invention relates to writing pads for entering information into data processors such as microcomputers.

Alphanumeric information is commonly entered into microcomputers by typing on a keyboard. Each keystroke is converted into a coded digital signal, such as an ASCII code. In some cases the keys are replaced by an array of key positions of a membrane type switch. Scanning circuitry is used to scan the rows and columns of key positions to determine which key position is being touched.

Writing pads enable a user to enter a sketch into the data processor by "writing" on the surface of the pad. As each point on the sketch is written, the pad senses its location and delivers analog signals corresponding to that location. The analog signals can be converted into digital signals from which the two-coordinate positon of the point can be determined.

SUMMARY OF THE INVENTION

In general, the invention features, in one aspect, a writing pad in which a grid of discrete electrical sensing elements are associated with the writing surface, the grid defining an array of discrete locations on the writing surface, the array having a density of at least 500 locations per square inch (preferably 5000), the grid being sensitive to writing stimuli received at each location, and digital circuitry connected to the grid for determining the locations at which the stimuli are being received.

The use of digital circuitry enables a rapid, precise determination of the locations at which stimuli are being received, without the noise associated with analog circuitry; the high density of discrete locations assures that writing can be sensed with high resolution.

In another aspect, the invention features circuitry which identifies the upper and lower boundaries along one dimension of the writing surface, of a local region at which writing stimuli are being received and which extends over more than one of the positions defined by a number of parallel electrical sensing lines arranged along that dimension.

In preferred embodiments, the sensing lines are organized in groups arranged in an order of group priority corresponding to the physical order of positions along the one dimension, there are first and second sets of encoders each encoder associated with one of the groups, and prioritizing circuitry for disabling all lower priority encoders within the first set when a higher priority encoder within the first set identifies stimuli received within the positions served by that higher priority encoder, and for disabling all higher priority encoders within the second set when a lower priority encoder within the second set identifies stimuli received within the positions served by that lower priority encoder; the scanning circuitry also identifies the upper and lower boundaries along the second dimension of the local region; each encoder is capable of providing touch signals to a group encoding circuitry and a switch routes touch signals and binary values to the group encoding circuitry selectively either from the first or second set of encoders.

Identifying the upper and lower boundaries of the local region of touching enables substantially instantaneous scanning of the entire writing surface without requiring clocking of the scanning cycles, even where a very large number of lines must be scanned. Having two sets of encoders enables the upper and lower boundaries to be identified while reducing the difficulty of handling local regions of touching which straddle the boundaries between areas served by adjacent encoders.

In another aspect, the invention features scanning the writing surface to identify the coordinate value along one dimension of the writing surface of a point at which writing stimuli are being received, by scanning respectively different predetermined portions of the writing surface along that one dimension, all of the portions being scanned simultaneously.

In preferred embodiments, there are a set of scanners and each scanner is connected to scan a predetermined group of electrical elements from among a plurality of electrical elements (i.e., parallel conductors arranged with a density of at least 40 per inch) which sense the receipt of writing stimuli at a series of different positions corresponding respectively to different coordinate values along the one dimension. The electrical elements within each group have a predetermined order, each element provides a signal only when writing stimuli are received at the corresponding coordinate value, and each scanner has an encoder which represents a signal from an element as a binary value indicative of the element's position in the predetermined order. Each scanner provides a touch signal when the corresponding portion of the writing surface is receiving stimuli. The scanners are arranged in a group order corresponding to increasing coordinate values along the one dimension, and there is group encoding circuitry for receiving the touch signals from the scanner and for representing it by a binary output value indicative of the position of the scanner in the group order. Th coordinate value along the other dimension is also identified by a second set of scanners which scan different portions of the writing surface along the other dimension, and the two sets of scanners are coordinated to identify both coordinate values.

By simultaneously scanning all portions of the writing surface, the time required for scanning the entire surface is reduced. The encoders permit the coordinate values to be determined rapidly even when there are a large number of electrical elements to be scanned.

In another aspect, the invention features a writing pad of the kind which identifies a point of touching by scanning sequences of electrical lines each corresponding to successive positions along one of two coordinates, and which defines a local zone around an identified point of touching and limits the scanning to that local zone.

In preferred embodiments, the local zone is redefined based on newly identified points of touching. The local zone contains and is centered on the identified point of touching. The limited scanning of the local zone is not done unless a point of touching has been identified within a predetermined prior period of time. Touching a point on a writing surface of the pad causes contact between a first conductive stripe belonging to one set of parallel stripes and a second conductive stripe belonging to a second set of stripes, the two sets being arranged respectively along the two coordinates, and scanning circuitry identifies the point of touching by identifying the first and second stripes which are in contact.

Use of a limited scanning zone based on an identified point of touching permits rapid scanning of even high resolution writing pads having very closely spaced conductive stripes. Redefining the local zone based on new points of touching allows the scanning to follow a line being stroked across the writing surface. Disabling the limited scanning feature allows the device to handle interruptions in writing, as when the stylus is lifted and moved to a new location on the writing surface.

In another aspect, the invention features a writing pad in which a portion of the writing surface has key zones each corresponding to a predetermined contiguous group of locations where writing stimuli can be received, and a particular digital symbol is generated and delivered to the data processor in response to writing stimuli being received at any of the locations corresponding to one of the key zones.

In preferred embodiments, the writing surface includes a writing region for entering freeform information and a keyboard region for entering characters (e.g., ASCII codes) and commands; and there are several of the keyzones arranged in rows and columns separated by spaces.

Providing key zones on the writing surface of the touch pad allows entry of freeform writing as well as key coded character and commands without having to switch modes between a writing pad and a separate keyboard. Each key zone can be activated by touching any location within the zone.

Other advantages and features of the invention will become apparent from the following description of the preferred embodiment and from the claims.

DESCRIPTION OF THE PREFERRED EMBODIMENTS

We first briefly describe the drawings.

DRAWINGS

STRUCTURE

Figure 1:
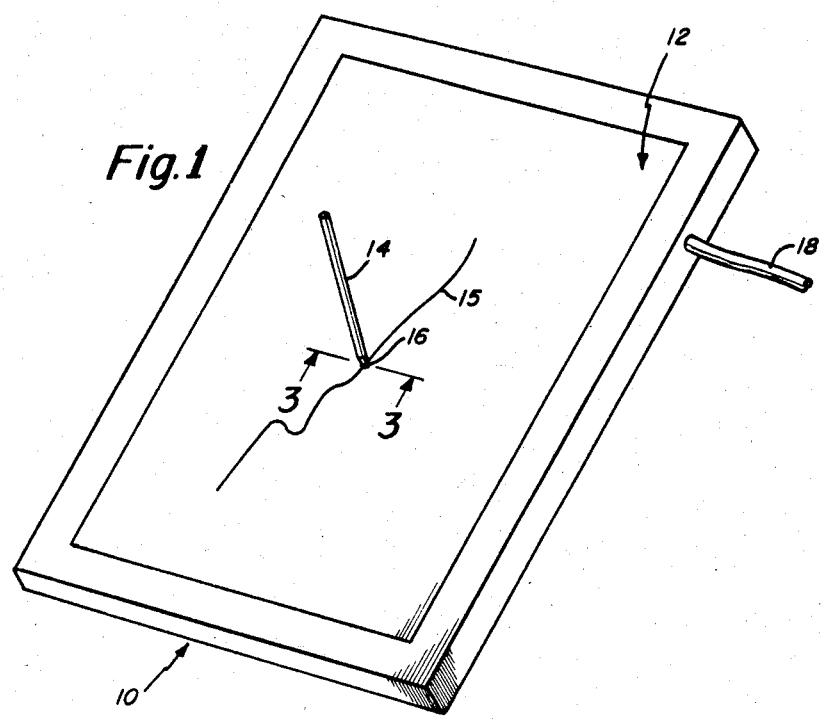
FIG. 1 is a writing pad.

Referring to FIG. 1, writing pad 10 has a broad, resilient writing surface 12 which can be written on using a finger or any stylus 14 by simply depressing surface 12 along a line 15 represented by a series of points, for example a point at location 16. Pad 10 is connected to a data processor (not shown) by a cable 18 which carries digital information identifying the locations of the series of points along the line being written.

Figure 2:
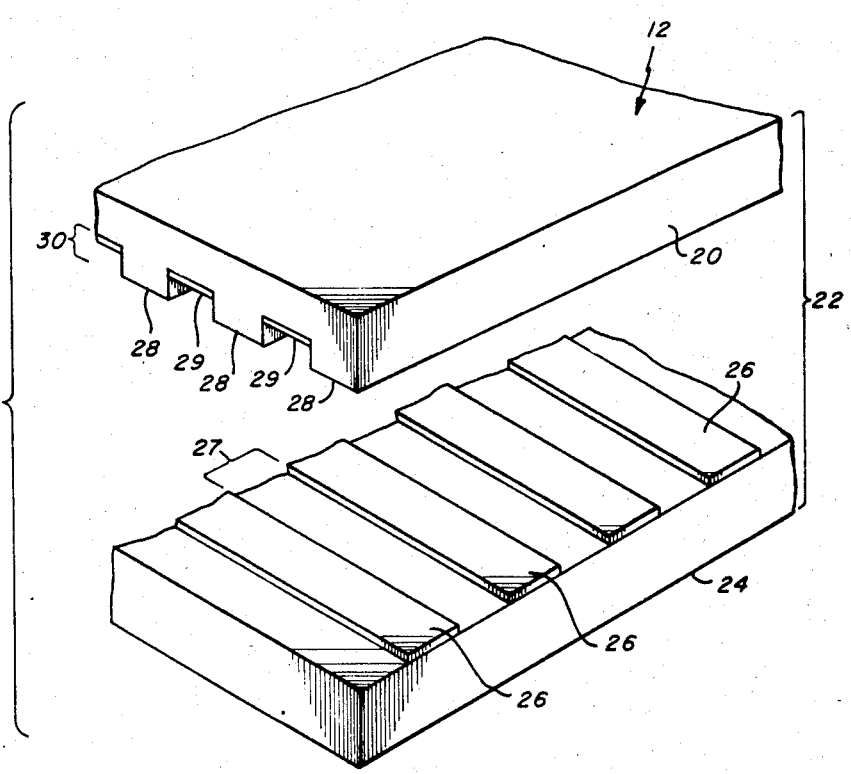
FIG. 2 is an enlarged, exploded fragmentary isometric view of a representatiive portion of the pad structure of the pad of FIG. 2.

Referring to FIG. 2, writing surface 12 is the upper face of a molded resilient silicone rubber membrane 20 which is the top layer of a pad structure 22. The bottom layer of pad structure 22 is a printed circuit board substrate 24 on which has been printed a series of parallel conductive stripes 26. Each stripe 26 is 5 mils wide and the separation 27 between adjacent stripes is 5 mils. Membrane 20 is molded to provide a series of parallel insulative linear spacers 28. Each spacer 28 is 10 mils wide and the separation between adjacent spacers is 10 mils. In the gaps between adjacent spacers are coated parallel conductive stripes 29. Only the ends of stripes 29 appear in FIG. 2. The height 30 of each spacer 28 is 0.5 mils. When pad structure 22 is assembled, stripes 26 are perpendicular to stripes 29. Spacers 28 keep stripes 26 and stripes 29 electrically separated unless surface 12 is depressed sufficiently to cause electrical contact.

Since pressure is equal to force divided by area, a ball point pen with a 20 mil diameter point will produce much more pressure than a palm resting on the surface of the pad. The spacers are arranged to have a resilience such that pressure from a pen point would be sufficient to cause electrical contact but pressure from a palm resting on the pad would not.

Thus, the structure 22 defines an array having 5000 contact points per square inch; however, the invention is also useful with any contact point densities of more than 500 per square inch.

Figure 3:
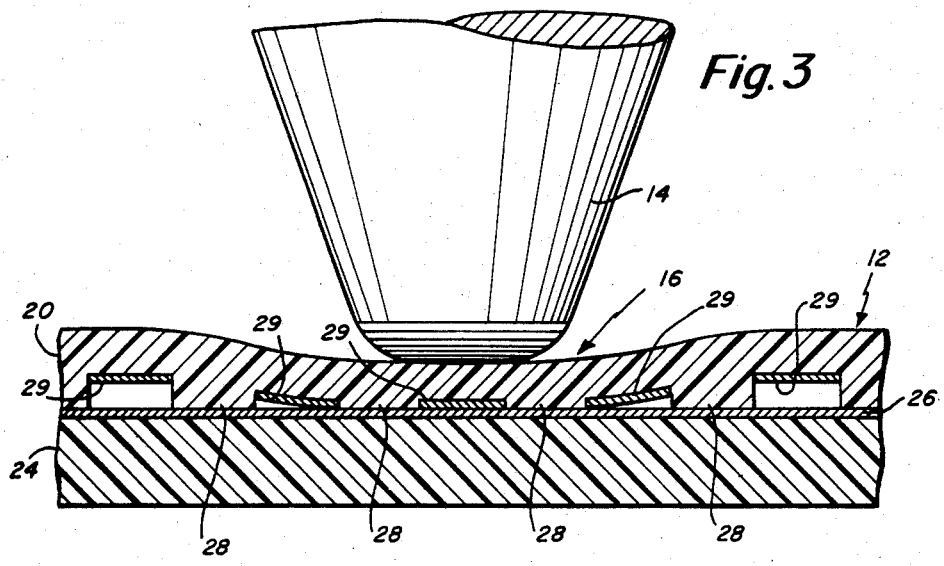
FIG. 3 is an enlarged cross-sectional view, not to scale, of a representative portion of the pad structure taken at 3—3 in FIG. 1.

Referring to FIG. 3, when surface 12 is depressed at location 16 by stylus 14, one or more of the stripes 29 are pressed into contact with one or more of the stripes 26 (only one of which appears in FIG. 3). Hereafter stripes 29 and 26 will respectively be referred to as rows and columns.

Figure 4:
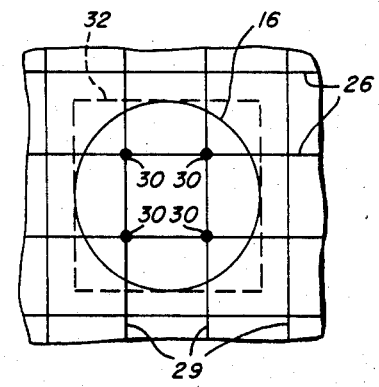
FIG. 4 is a diagram of a portion of the pad writing surface.

Referring to FIG. 4, the points of contact 30 between rows and columns caused by depressing surface 12 at location 16 all typically lie within a region 32 (indicated by dashed lines).

Pad 12 generates digital signals indicating the uppermost and lowermost rows 29, and the leftmost and rightmost columns 26 which are within region 32.

Figure 5:
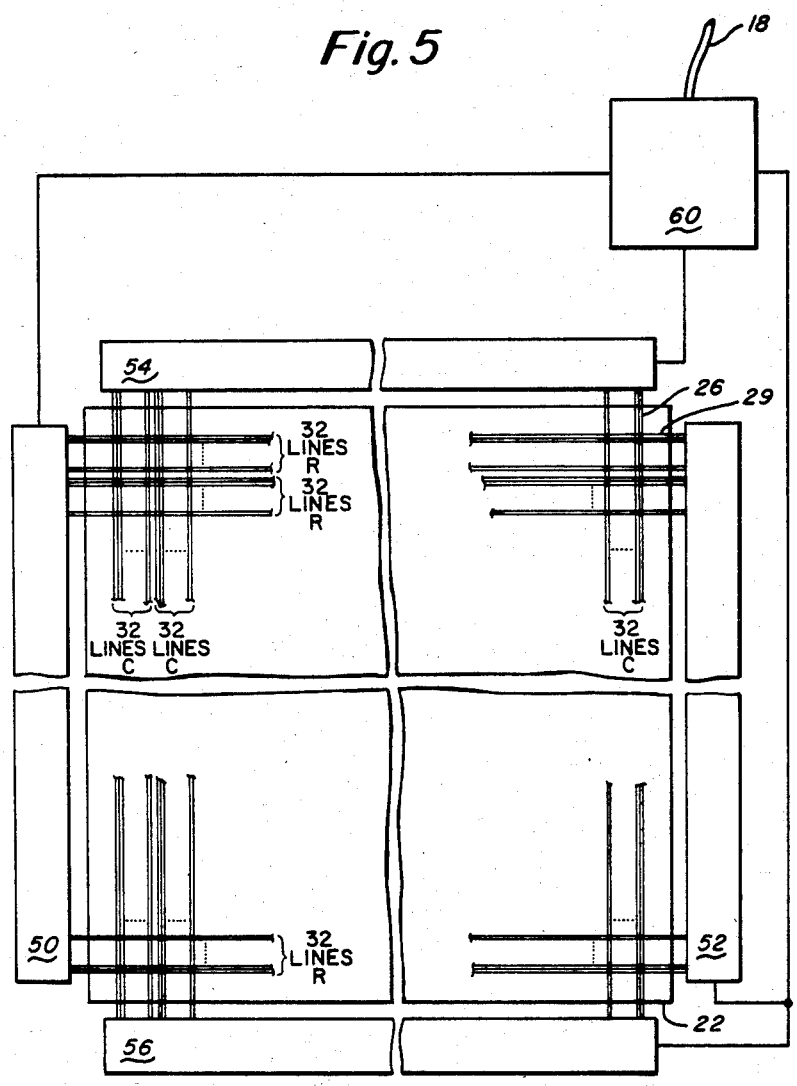
FIG. 5 is a top view, broken away, of a representative portion of the pad structure with associated circuitry.

Referring to FIG. 5, there are a total of 512 rows 29 and 800 columns 26. At the left edge of pad structure 22 all of the rows are connected to row sensing circuitry 50, while at the right end they are all connected to row powering circuitry 52. Likewise, at the upper and lower edges of structure 22 all columns are connected respectively to column sensing and column powering circuitries 54, 56. The row and column sensing and powering circuitries are all connected to control circuitry 60.

The 512 rows are organized into 16 groups, 32 lines per group. (Each row group is labeled R in FIG. 1.) The 800 columns are organized into 25 groups, 32 lines per group. (Each column group is labeled C in FIG. 1.) Only three of the groups of rows and three of the groups of columns are shown in FIG. 5.

Each row and each column can be identified by the group to which it belongs and its position within the group, where the groups and the rows and columns within them are all numbered in order along each dimension of the pad. For example, a particular row might be the fourth row down in the eighth group down from the top edge of the pad.

Figure 6:
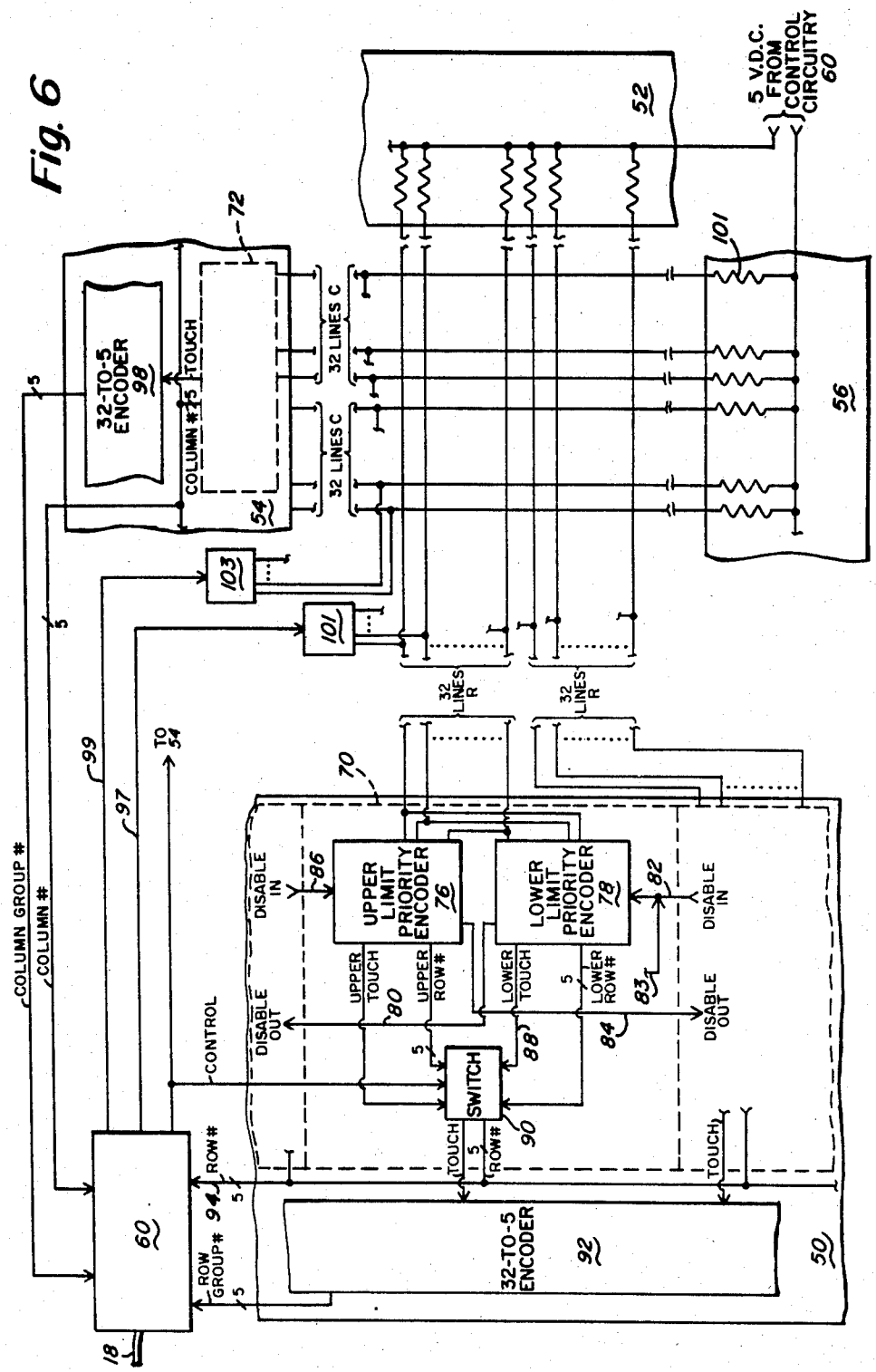
FIGS. 6, 7 are block diagrams of representative portions of the circuitry.

Referring to FIG. 6, the rows in each group are connected to an associated row encoding circuit 70 in row sensing circuitry 50. Only one row encoding circuit 70 is shown in detail in FIG. 6. Each column is likewise connected to its own column encoding circuit 72 in column sensing circuitry 54. Only one representative column encoding circuit 72 is indicated in FIG. 6, and its structure is like that of row encoding circuit 70. Each row encoding circuit 70 serves a band of the pad corresponding to the rows connected to it; similarly each column encoding circuit 72 serves a band corresponding to the columns connected to it.

Each row encoding circuit 70 includes an upper limit priority encoder 76 and a lower limit priority encoder 78. All 32 rows associated with the encoding circuit are connected to both upper and lower encoders 76, 78. The circuitry within both upper and lower encoders 76, 78 is identical but the rows are connected to the upper encoder in the opposite order from the order of connections for the lower encoder. In each column encoding circuit 72, the priority encoders are called left limit and right limit priority encoders respectively but their functions are analogous to priority encoders 76, 78.

All of the priority encoders are of a type like Texas Instruments type SN74LS348 8-line-to-3-Line Priority Encoders with 3 State Outputs, except that they encode 32 input lines to 5 output lines.

Each lower limit priority encoder 78 is connected by disable lines 80 to carry disable signals to all other lower limit priority encoders serving rows closer to the top of the pad, and is also connected by disable lines 82 to receive disable signals from all other lower limit priority encoders serving rows closer to the bottom of the pad. Analogous interconnections of the upper limit priority encoders are effected by disable lines 84, 86. Each disable line 82 can itself be disabled (to prevent the delivery of disable signals to the corresponding encoder 78) by a control line 83 from control circuitry 60. Similar disabling interconnections are made among the left limit and right limit priority encoders serving the columns. Thus, the priority encoders are connected to effect orders of priority corresponding to upper, lower, left, and right directions on the pad.

Within each priority encoder is circuitry which translates a logical low signal appearing on a particular row or column input into a 5-bit binary value corresponding to the position of that row or column among the 32 rows or columns served by that encoder. For example, if a logical low signal appears on the second uppermost row served by encoder 78, the 5-bit output of the encoder (called lower row # in FIG. 6) is 00010. Each priority encoder circuitry is also arranged so that if logical signals simultaneously appear on more than one of the input rows (or columns), the uppermost one is encoded, the others being ignored. Thus, the rows or columns are connected to each priority encoder to effect orders of priority corresponding to upper, lower, left, and right directions on the pad.

Each priority encoder also has a one bit touch output, e.g., the lower touch line 88 coming from encoder 78. The touch line goes high whenever any of the rows (or columns) served by that encoder is high. In each encoding circuit 70, the row # and touch outputs of both encoders 76, 78 are connected through a switch 90 (under control from control circuitry 60) to a conventional 32-to-5-encoder 92. The five-bit row # lines from all switches 90 serving all encoding circuits 70 are connected together, bitwise, and fed to control circuitry 60 over line 94. The touch outputs from all switches 90 are connected to encoder 92. The output of encoder 92 is a 5-bit value (now group #) corresponding to the relative position of the encoding circuit 70 which is delivering a touch output at a given time. For example, if the eighteenth encoding circuit from the top of the pad is providing the touch signal, the output of encoder 92 is 10010.

Similar connections exist for the column # and touch outputs of the column encoding circuit 72.

Control circuitry 60 is also connected by a drive low line 97 via a row drive circuit 101 to all rows and by a separate drive low line 99 via a column drive circuit 103 to all columns.

Figure 7:
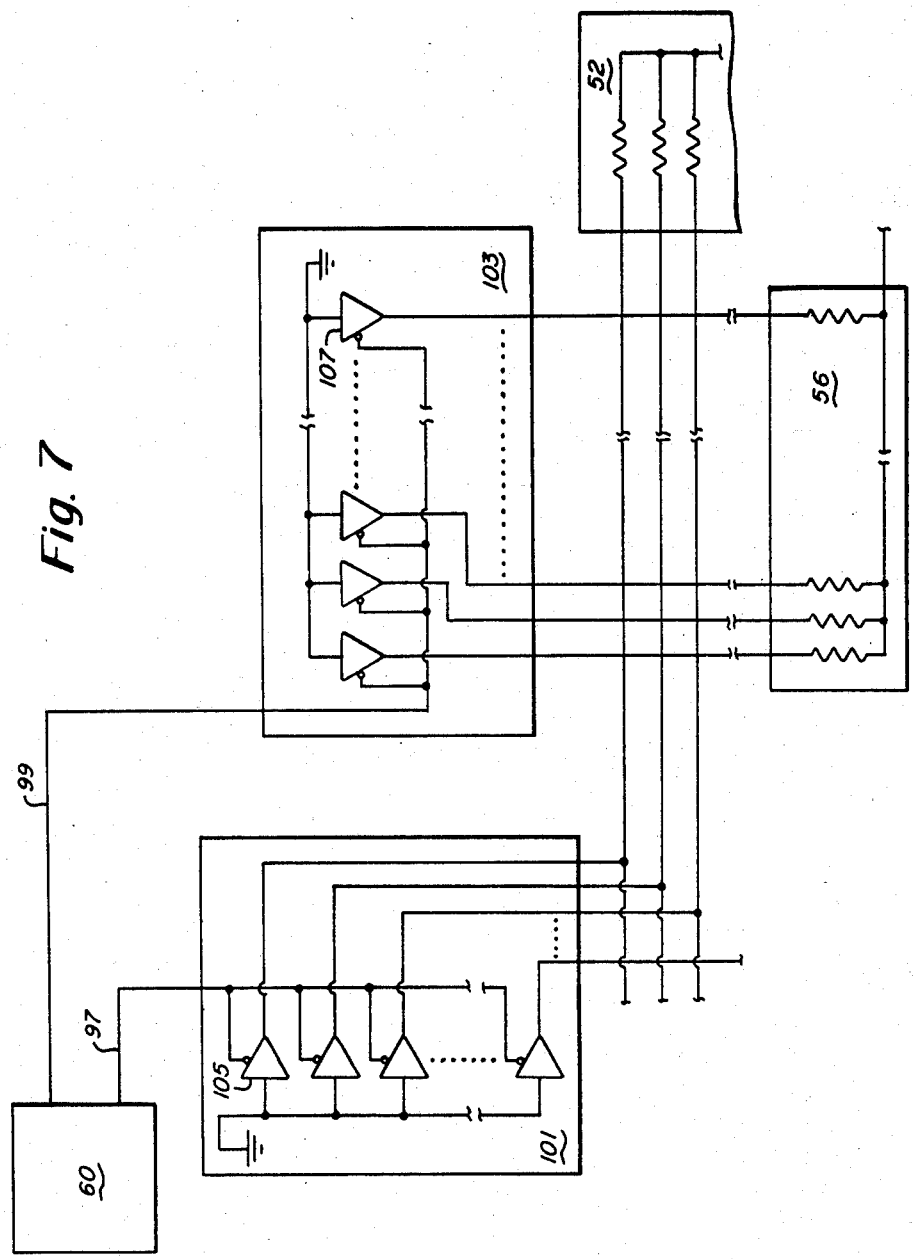

Referring to FIG. 7, row drive circuit 101 contains a set of gates 105, one for each row. Each gate 105 has its signal input connected to ground, its output to its associated row, and its control input connected to line 97. A similar set of gates 107 is controlled by signals on line 99.

Powering circuitries 52, 56 each have parallel 100 k ohm resistors 101 each connected between one of the rows and columns and 5 volts DC power supplied from control circuitry 60.

OPERATION

With 5 volts connected to powering circuitry 52, control circuitry 60 first drives all columns low by a low signal provided over lines 99 to trigger gates 107 (line 97 remains high). All rows then remain logically high (being powered from circuit 52) except for any rows which are in contact with columns as a result of writing surface 12 being depressed. Several adjacent rows are likely to be in contact with columns at the location 16 where the surface is being depressed (FIG. 4).

Each row which is in contact with a column is drawn low. The uppermost one of these rows will be encoded by its upper limit priority encoder into an upper row #. That same encoder will deliver an upper touch signal to its switch 90, and will send disable signals to all upper limit priority encoders which are nearer to the bottom of the pad. Simultaneously, the lowermost one of the rows which is in contact with a column will be encoded by its lower limit priority encoder into a lower row #. That same encoder will deliver a lower touch signal to its switch 90 and will send disable signals to all lower limit priority encoders which are nearer to the top of the pad. As a result the priority encoders 76, 78 essentially instantaneously determine the uppermost and lowermost rows which are in contact with a column.

Control circuitry 60 issues a high signal over line 54 to switch 90, which then passes the upper touch signal to encoder 92 and the upper row # to circuitry 60. Encoder 92 then delivers the row group # to circuitry 60.

Next control circuitry 60 issues a low signal over line 54 to switch 90 which then passes the lower touch signal to encoder 92 (which delivers the corresponding row group #) and the lower row # to circuitry 60.

Next the same process is followed to determine the leftmost and rightmost columns which are in contact with a row. Circuitry 60 supplies 5 volts DC to powering circuitry 56 and drives all rows low by a low signal provided over line 97 to trigger gates 105 (line 99 is set high). The priority encoders essentially instantaneously determine the leftmost and rightmost columns which are in contact, and that information is passed to circuitry 60 by switching between left limit and right limit encoders and encoding of the column group in the same manner as explained above for the rows.

The information about the upper, lower, left, and right limits of contact is then delivered over line 18 to a data processor, where the centroid of the location 16 is determined.

Circuitry 60 repeats the sequence set forth above with a cycle rate which is rapid enough to accurately track normal speed writing.

In the case where pressure from a user's palm at the lower part of the pad occurs simultaneously with pressure from the stylus at the upper part of the pad, the lower boundary of touching may erroneously be sensed at the point where the palm pressure is being applied. Control signals sent over lines 83 can then be used to disable the conveyance of the disable signals to higher ranked lower priority encoders, thus permitting the system to disregard the palm pressure.

Thus, the precise points where surface 12 is being depressed are determined almost instantaneously without the need for clocked scanning, notwithstanding that there are a very large number of rows and columns. The speed and accuracy are essentially independent of the number of rows and columns. No analog-to-digital conversion is required.

OTHER EMBODIMENTS

Figure 8:
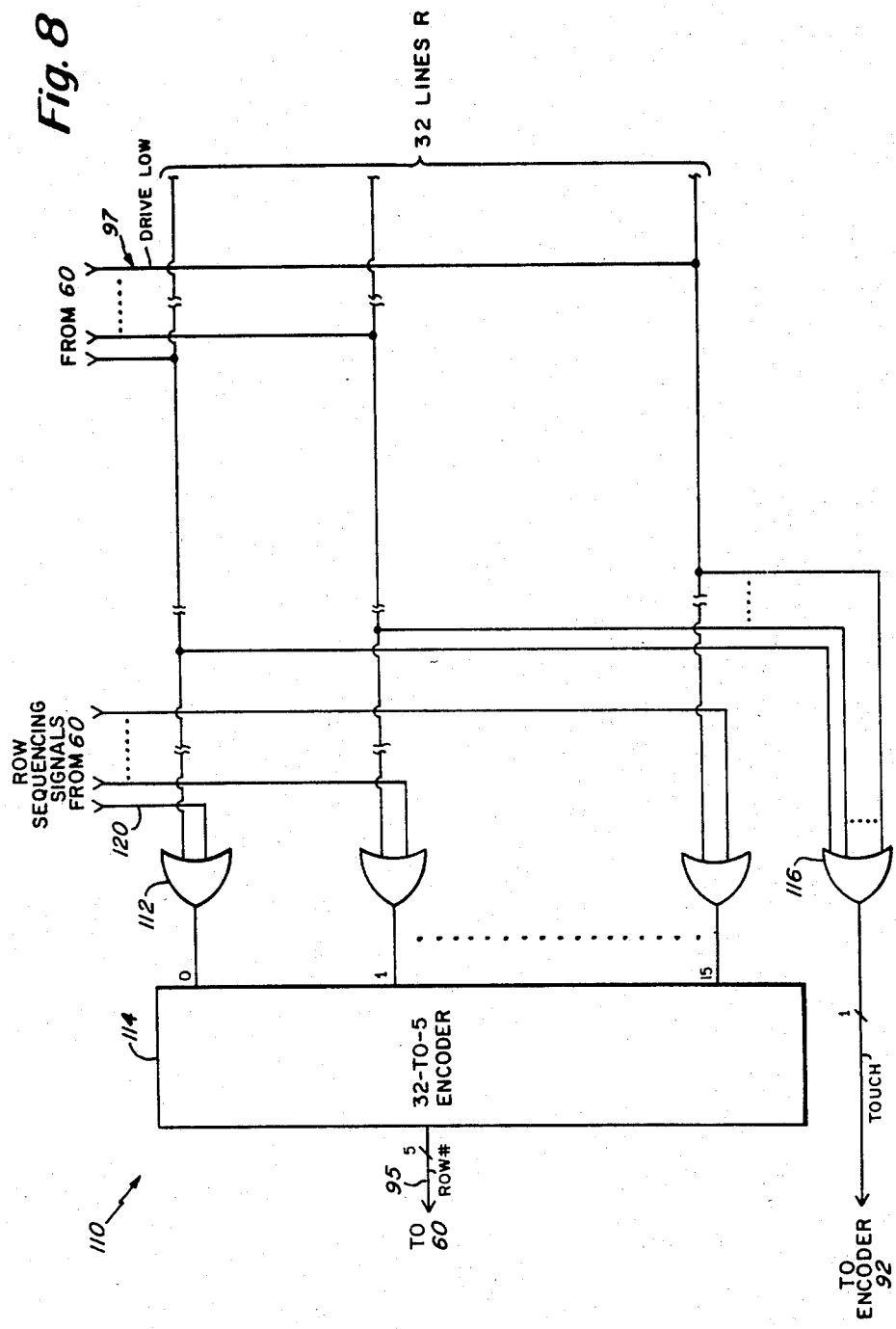
FIGS. 8, 9 are block diagrams of alternate embodiments of the circuitry.

Referring to FIG. 8, in another embodiment, each row encoding circuit 70 is replaced by a non-prioritizing scanning circuit 110 which is repeatedly scanned by clocking circuitry to determine which rows are in contact with which columns. Similar non-prioritizing scanning circuits are substituted for each column encoding circuit 72.

The 16 rows of each group R served by scanning circuit 110, are connected in order respectively via OR gates 112 to the 32 inputs of a conventional 32-to-5-encoder 114 whose output is a 5-bit row # corresponding to a row on which a logical low signal appears. All of the 32 rows are also connected to an OR gate 116 whose output is the touch signal delivered to encoder 92. All of the 32 rows are also connected via lines 97 to receive drive low signals from control circuitry 60. A second input of each OR gate 112 is connected to one of 32 lines 120 to receive row sequencing signals from circuitry 60. Circuitry 60 is arranged to deliver to the 32 lines 120, one at a time in sequence, a logical high signal to cause reading of the corresponding row.

In operation first all columns are driven low and all rows are connected to 5 volts DC. A row making contact with any column then goes low. The lines 120 are driven low one at a time in sequence. When both inputs to an OR gate 112 are low, the output goes low, and that row is encoded as a row # by encoder 114. The output of OR gate 116 also goes low and is delivered to encoder 92 for encoding as the row group #. Next, all rows are driven low and all columns are connected to 5 volts DC. The columns are then scanned in sequence to generate column group # and column # signals for delivery to circuitry 60 in the same manner described above for the rows. Note that all row groups are scanned simultaneously and all column groups are scanned simultaneously reducing the total time required to scan the writing surface.

Thus, the entire surface 12 can be scanned accurately and rapidly enough to track lines drawn at normal writing speed, even though the numbers of rows and columns are relatively large. Again, no analog to digital conversion is required. And the accuracy and speed are essentially independent of the total number of rows and columns.

Figure 9:
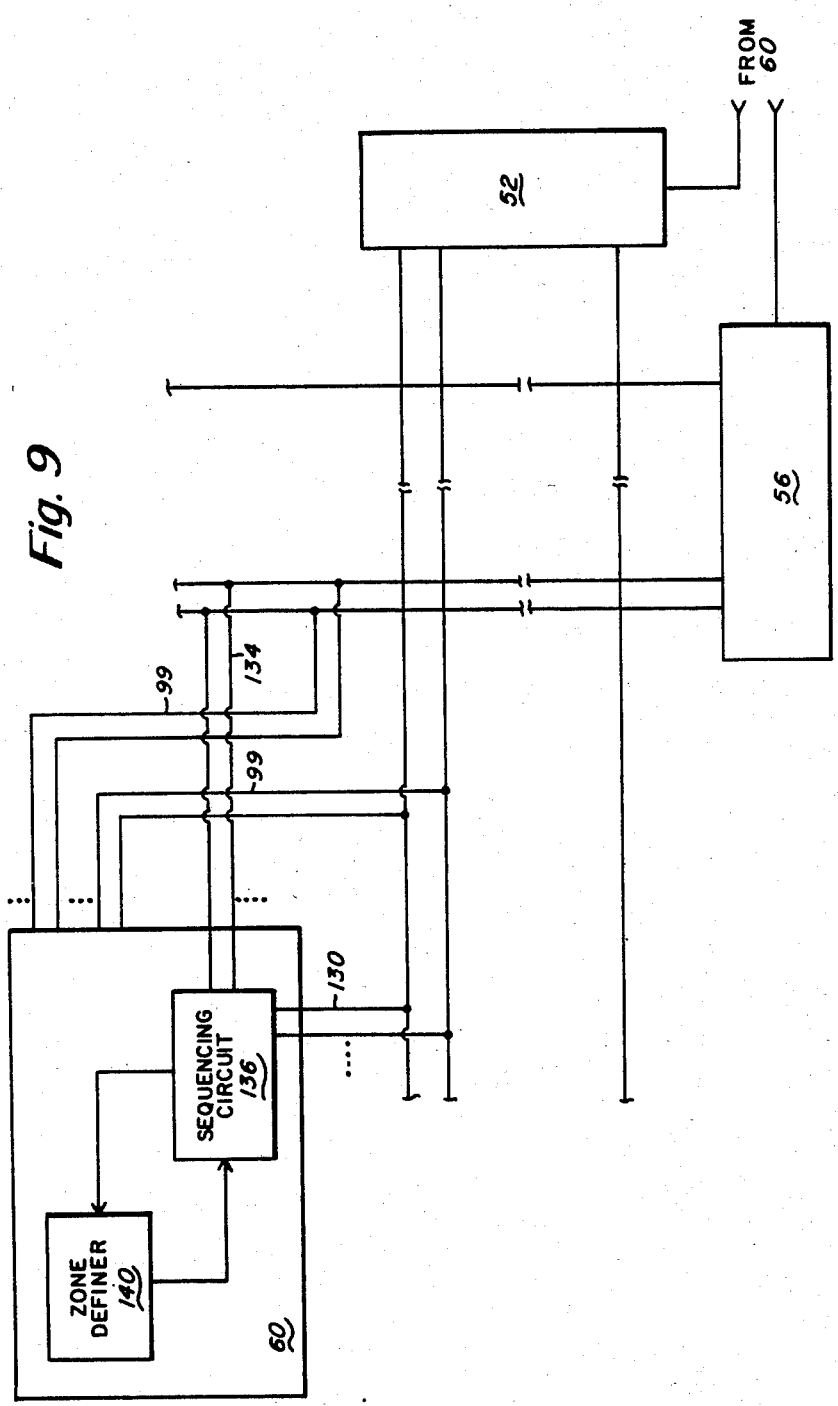

Referring to FIG. 9, in another embodiment, the sensing circuitries 50, 52 are removed and the rows and columns are connected directly by individual lines 130, 134 to a sequencing circuit 136 in control circuit 60. Sequencing circuit 136 is arranged to sense a logical low on successive individual rows and successive individual columns. For example, while all columns are driven low by signals over lines 99 and all rows are powered from circuitry 52, if there are contacts between any rows and columns, the sequencing circuit 136 reads each row in turn from top to bottom. Then all rows are driven low, the columns are powered, and each column is read in turn from left to right. This scanning cycle is repeated until a location on surface 12 is depressed causing contact between at least one row and one column. During the next scanning cycle, that row and column are identified because they are drawn low as a result of the contact. The identity of that point is then delivered to a zone definer 140.

Zone definer 140 then identifies a zone of sixteen rows and sixteen columns with the zone centered on the identified point of contact, and delivers signals to the sequencing circuitry identifying the boundaries of the zone.

Then, in subsequent cycles, instead of scanning all rows and columns, only that local zone is scanned, a process which can be accomplished very rapidly. This local zone will remain unchanged until a scanning cycle in which the location of contact between a row and column changes. Then the local zone will be moved so as to remain centered on the new contact location. Thus, the local zone will follow the contact location as it changes when a line is written on surface 12.

Should the stylus be lifted and moved to another distance location on surface 12, the local zone scanning in the next scanning cycle would find no point of contact. The scanning will then revert to the fall scanning cycle until a new location of contact is identified; then local zone scanning will resume.

Scanning of a moving local zone can proceed rapidly enough to track normal speed writing, even though the total numbers of rows and columns in the pad are very large.

Figure 10:
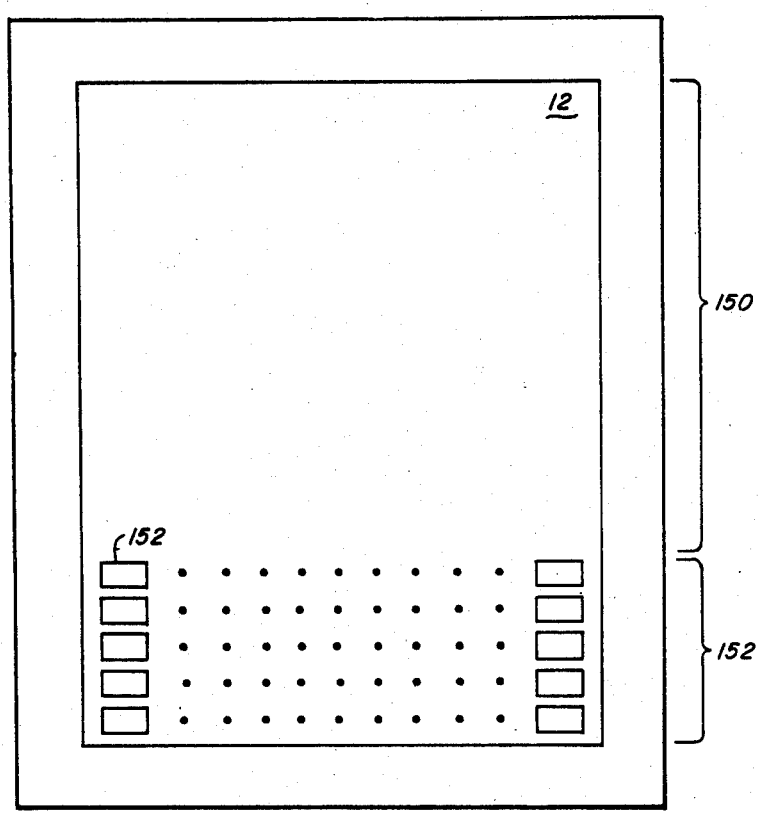
FIG. 10 is a top view of an alternate embodiment of the writing surface.

Referring to FIG. 10, in another embodiment, surface 12 includes both a freeform writing region 150 and a keyboard region 152 within which appropriate markings define rows and columns of key zones 152 separated by spaces, each key zone corresponding to one of the keys on a typical microcomputer keyboard. Control circuit 60 includes means for treating the pressing of any point within one of the key zones as corresponding to an ASCII character or to a command. Thus, when contact is sensed between a row and column at any location within one of the key zones, the control circuit looks up the corresponding ASCII code or command and delivers the identity of the code or command over line 18.

By including both a keyboard region and a freeform writing region on the same touch pad surface, the user can easily, quickly, and conveniently enter both freeform written information and key-coded information without having to move between a touch pad and a keyboard.

Other embodiments are within the following claims.

What is claimed is:

1. Scanning circuitry for a writing pad of the kind having a succession of parallel electrical sensing lines defining a series of positions along one dimension of a writing surface of said pad, said electrical sensing lines being responsive to writing stimuli received at said writing surface, said scanning circuitry comprising identifying circuitry for identifying the upper and lower boundaries along said dimension of an adaptive local region at which said writing stimuli is being received, said local region encompassing more than one said position at which stimuli are being received, and said local region changes its location according to the position at which stimuli are being received to maintain the positioning of said local region relative to the current stimuli position.

2. Scanning circuitry for a writing pad of the kind having a succession of parallel electrical sensing lines defining a series of positions along one dimension of a writing surface of said pad, said electrical sensing lines being responsive to writing stimuli received at said writing surface, said scanning circuitry comprising
identifying circuitry for identifying the upper and lower boundaries along said dimension of a local region at which said writing stimuli is being received, said local region encompassing more than one said position at which stimuli are being received,
said sensing lines are organized in groups, said groups being arranged in an order of group priority corresponding to the physical order of said positions along said dimension,
said identifying circuitry comprises
first and second sets of encoders each associated with one said group, said encoders of each set having an order of priority corresponding to said group priority, and
prioritizing circuitry for disabling all lower priority encoders within said first set when a higher priority encoder within said first set identifies one said position at which stimuli are being received within the positions served by said higher priority encoder, and for disabling higher priority encoders within said second set when a lower priority encoder within said second set identifies on said position at which stimuli are being received within the positions served by said lower priority encoder.

3. The scanning circuitry of claim 1 wherein said writing pad further comprises a second succession of parallel electrical sensing lines defining a second series of positions along a second dimension of said writing surface, said electrical sensing lines being responsive to writing stimuli received at said writing surface, said scanning circuitry comprising
identifying circuitry for identifying the upper and lower boundaries along said second dimension of said local region.

4. The scanning circuitry of claim 2 wherein each said encoder comprises an encoding circuit for representing a signal provided on a sensing line as a binary value indicative of the corresponding said position along said one dimension.

5. The scanning circuitry of claim 2 wherein each said encoder in said first set includes a means for providing a touch signal when it is the highest priority encoder which identifies a position at which stimuli are being received, and each encoder in said second set includes a means for providing a touch signal when it is the lowest priority encoder which identifies a position at which stimuli are being received, said scanning circuitry further comprising
first group encoding circuitry connected to receive said touch signal from said first set of encoders and to represent said touch signal by a binary value indicative of the position of said encoder in said group priority and
second group encoding circuitry connected to receive said touch signal from said second set of encoders and to represent said touch signal by a binary value indicative of the position of said encoder in said group priority.

6. The scanning circuitry of claim 5 further comprising a switch for routing said touch signals and said binary values to said group encoding circuitry selectively either from said first or second set of said encoders.

7. A writing pad for entering information into a data processor comprising
a writing surface for receiving writing stimuli at different points on said surface each point being defined by a pair of coordinate values in a two dimensional grid, and
scanning circuitry for scanning said writing surface to identify the coordinate value along one said dimension of a point at which writing stimuli are being received, said scanning circuitry comprising
means for scanning respectively different predetermined portions of said writing surface along said one dimension, said means for scanning being operable to scan all of said portions simultaneously.

8. The writing pad of claim 7 wherein
said scanning circuitry further comprises a plurality of electrical elements for sensing the receipt of said writing stimuli at a series of different positions corresponding respectively to different said coordinate values along said one dimension, and
said means for scanning comprises a set of scanners each connected to scan a predetermined group of said electrical elements.

9. The touch pad of claim 8 wherein
said electrical elements within each said predetermined group have a predetermined order corresponding to increasing coordinate values along said one dimension,
each said electrical element is connected to provide a signal only when said writing stimuli are being received with respect to the corresponding coordinate value along said one dimension, and
each said scanner comprises an encoder for representing a signal provided on an electrical element as a binary value indicative of the position of said element in said predetermined order.

10. The touch pad of claim 7 wherein each said scanner includes a means for providing a touch signal when writing stimuli are being received at said predetermined portion of said writing surface served by said scanner.

11. The touch pad of claim 10 wherein said scanners have a predetermined group order corresponding to increasing coordinate values along said one dimension, and further comprising group encoding circuitry connected to receive said touch signal from each said scanner and to represent said touch signal by a binary value indicative of the position of said scanner in said predetermined group order.

12. The touch pad of claim 7 wherein
said scanning circuitry is further arranged to identify the coordinate value along the other said dimension of said point at which writing stimuli are being received,
said scanning circuitry further comprises a second set of scanners for scanning respectively different predetermined portions of said writing surface along said other dimension, and said touch pad further comprises means for coordinating the first and second sets of said scanners to identify said coordinate values along both said dimensions of said point at which said writing stimuli are being received.

13. The touch pad of claim 8 wherein each said set of scanners further comprises clocking circuitry for triggering the sequential scanning of each said predetermined group of electrical elements.

14. The touch pad of claim 8 wherein said elements comprise parallel conductors spaced with a density of at least 40 per inch.

15. The writing pad in claim 7 further comprising a portion of said writing surface comprising key zones each corresponding to a predetermined contiguous group of said points, and wherein said scanning circuitry includes means for generating in response to writing stimuli being received at any of the points corresponding to one said key zone a particular digital smybol, and for routing said digital signals and symbols to said data processor.

16. The writing pad of claim 15 wherein said writing surface comprises a writing region for entering freeform information and a keyboard region for entering characters and commands.

17. The writing pad of claim 15 wherein there are a plurality of said key zones arranged in rows and columns on only said key zone portion of said writing surface.

18. The writing pad of claim 15 wherein said digital symbols include ASCII character codes.

19. The writing pad of claim 15 further comprising means for defining a local zone in the region of an identified said point where said writing stimuli are being received, and said scanning circuitry further comprising means for limiting said scanning to said local zone.

20. Apparatus for scanning a writing pad of the kind which identifies a point of touching within a two-coordinate system by scanning two sequences of electrical lines each sequence corresponding to successive positions along one of said two coordinates, the apparatus comprising means for defing an adaptive local zone in the region of an identified said point of touching, said local zone changes its location according to the identified said point of touching to maintain the positioning of said local zone relative to the current point of touching, and means for limiting said scanning to said local zone.

21. The apparatus of claim 20 wherein said means for defining is arranged to redefine said local zone based on newly identified points of touching.

22. The apparatus of claim 20 wherein said local zone contains and is centered on said identified point of touching.

23. The apparatus of claim 20 wherein said means for limiting is disabled when a said point of touching has not been identified.

24. The apparatus of claim 20 wherein said electrical lines comprise two sets of parallel conductive stripes arranged respectively along said two coordinates, said two sets being situated in two parallel spaced-apart planes, and said apparatus further comprises a writing surface associated with said two sets of conductive stripes, said point of touching being on said writing surface, said touching causing contact between a first stripe in one said set and a second stripe in the other said set, and scanning circuitry for identifying said first and second stripes.

* * * * *